(12) United States Patent  
Goodman (10) Patent No.: US 8,971,525 B2
(45) Date of Patent: Mar. 3, 2015

(54) METHOD, MODULE AND SYSTEM FOR PROVIDING CIPHER DATA

(75) Inventor: James Goodman, Ottawa (CA)

(73) Assignee: ATI Technologies ULC, Markham, Ontario (CA)

( * ) Notice: Subject to any disclaimer, the term of this patent is extended or adjusted under 35 U.S.C. 154(b) by 1430 days.

(21) Appl. No.: 11/678,819

(22) Filed: Feb. 26, 2007

(65) Prior Publication Data

US 2008/0205634 A1    Aug. 28, 2008

(51) Int. Cl.
*H04L 9/00* (2006.01)
*G06F 12/14* (2006.01)
*H04L 9/06* (2006.01)
*H04L 9/18* (2006.01)
*H04L 29/06* (2006.01)
*H04L 9/12* (2006.01)

(52) U.S. Cl.
CPC ........ *H04L 9/065* (2013.01); *H04L 9/18* (2013.01); *H04L 63/0457* (2013.01); *H04L 63/068* (2013.01); *H04L 9/12* (2013.01); *H04L 2209/12* (2013.01); *H04L 2209/605* (2013.01)
USPC ................ 380/28; 380/29; 713/193; 713/194

(58) Field of Classification Search
CPC ....................................................... H04L 9/18
USPC ........................................................ 380/28
See application file for complete search history.

(56) References Cited

U.S. PATENT DOCUMENTS

| 5,940,508 | A | 8/1999 | Long et al. |
| 6,052,466 | A * | 4/2000 | Wright ........................ 380/262 |
| 7,131,004 | B1 | 10/2006 | Lyle |
| 7,295,578 | B1 | 11/2007 | Lyle et al. |
| 2004/0064694 | A1 | 4/2004 | Lee et al. |
| 2005/0027994 | A1 | 2/2005 | Sai |
| 2007/0049117 | A1 | 3/2007 | Heo |
| 2007/0237332 | A1 * | 10/2007 | Lyle ........................... 380/263 |

FOREIGN PATENT DOCUMENTS

| JP | 59-92649 | 5/1984 |
| JP | 05-316103 | 11/1993 |
| JP | 11-196081 | 7/1999 |
| JP | 11-274999 | 10/1999 |
| JP | 2001-007801 | 1/2001 |
| JP | 2001-345798 | 12/2001 |
| JP | 2002281464 | 9/2002 |
| JP | 2003-258788 | 9/2003 |
| JP | 2005071029 | 3/2005 |

(Continued)

OTHER PUBLICATIONS

Intel Corporation. High-Bandwidth Digital Content Protection System Revision 1.2. Jun. 13, 2006.

(Continued)

*Primary Examiner* — Longbit Chai
(74) *Attorney, Agent, or Firm* — Faegre Baker Daniels LLP (57) ABSTRACT

A method of providing cipher data during a period of time when output of a primary source of cipher data is unavailable is disclosed. The method comprises switching from a primary source of cipher data to an alternate source of cipher data at a beginning of the period of time; using the cipher data from the alternate source during the period of time; and switching back to the primary source at an end of the period of time.

31 Claims, 10 Drawing Sheets

(56) References Cited

FOREIGN PATENT DOCUMENTS

| JP | 2005341219 | 12/2005 |
|----|------------|---------|
| WO | 2005015819 A1 | 2/2005 |

OTHER PUBLICATIONS

Intel Corporation. High-Bandwidth Digital Content Protection System Revision 1.3. Dec. 21, 2006.
Video Electronics Standards Association. VESA DisplayPort Standard Version 1.0. May 1, 2006.
Video Electronics Standards Association. VESA DisplayPort Standard Verson 1.1. Mar. 19, 2007.
Japanese Patent Office, "Office Action", dated Feb. 5, 2013 in related Japanese Patent Application No. 2009-550192.
Chinese Office Action; Chinese Application No. 200880006261.7; dated Feb. 28, 2012.
European Patent Office, "Extended European Search Report", dated Apr. 23, 2013 in European Patent Application No. 08714692.4.
Anonymous, "High-bandwidth Digital Content Protection System. Revision 1.3", Digital Content Protection LLC, Dec. 21, 2006, pp. 1-90, Retrieved from the Internet: http://www.digital-cp.com/files/static_page_files/8006F925-129D-4C12-C87899B5A76EF5C3/HDCP_Specification%20Rev1_3.pdf [retrieved on May 16, 2014].
Japanese Patent Office, Notice of Allowance, mailed Sep. 3, 2013, in related Japanese application No. 2009-550192.

* cited by examiner

METHOD, MODULE AND SYSTEM FOR PROVIDING CIPHER DATA

FIELD OF THE INVENTION

The present invention relates to a method, a module and a system for providing cipher data, in particular during a period of time when output of a primary source of cipher data is unavailable.

BACKGROUND

Modern digital applications heavily rely on the secure exchange of data. Digital content, including digital audio and video, for example, is often stored, and transmitted in encrypted form, for later decryption by authorized recipients. Not surprisingly, many encryption/decryption techniques are known.

For example, the High-bandwidth Digital Content Protection (HDCP) protocol is used to protect digital data video streams over a high bandwidth point-to-point link. HDCP is for example used by displays interconnected with video sources over the High Definition Multimedia Interface (HDMI) and the Digital Video Interface (DVI).

Figure 1:
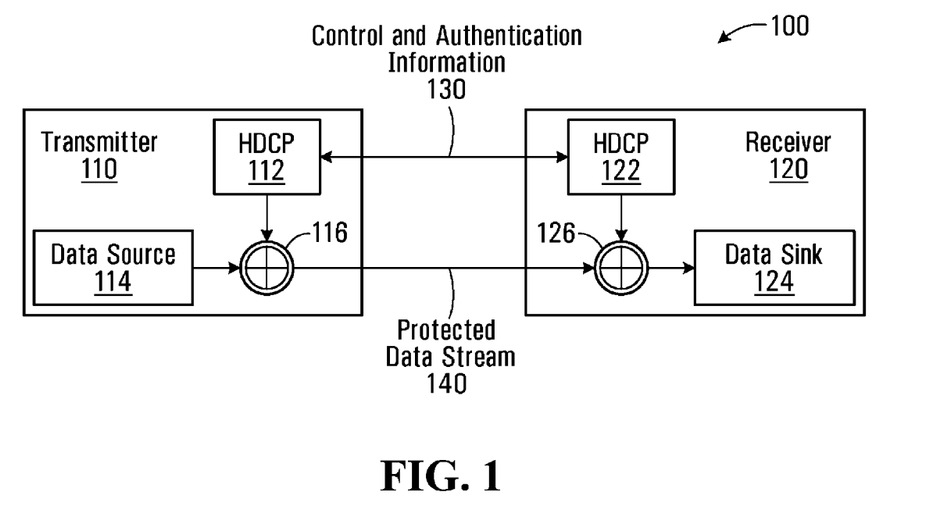
FIG. 1 is a block diagram of an HDCP system.

HDCP utilizes an initial authentication phase to initialize a cipher engine that is then used to create pseudo-random encryption cipher stream that is then XORed (Exclusive Or) with the data stream that is to be protected. The resulting data stream cannot be deciphered without generating a decryption cipher stream identical to the encryption cipher stream, and XORing it with the protected data stream to recover the initial data. A simple HDCP transmitter/receiver system 100 is shown in FIG. 1.

System 100 includes a transmitter 110 and a receiver 120. Transmitter 110 includes an HDCP engine 112 that produces HDCP cipher data for encrypting data from a data source 114. The cipher data is combined with the data from the data source using an XOR gate 116, thereby producing a protected data stream 140.

Receiver 120 includes an HDCP engine 124 that, like HDCP engine 112, produces HDCP cipher data for decrypting the protected data stream 140. The HDCP cipher data is combined with the protected data stream 140 using an XOR gate 126, the output which is directed to a data sink 124.

HDCP engines 112 and 122 exchange control and authentication information 130 to ensure that they are authorised to perform the encryption/decryption requested and to ensure that they are synchronized with each other.

Transmitter 110 and receiver 120 must periodically re-initialize (i.e., re-key). This is done for each line of video, and for each frame of video provided by transmitter 110. Re-keying makes sure that the transmitter 110 is in synch with receiver 120. After each line, the HDCP system performs a soft re-key that typically takes 58 cycles. After each frame, a hard re-key is performed for which 142 cycles are allocated.

Unfortunately, encryption is not possible during the re-key periods, as cipher engines 112 and 122 do not generate encryption data during these periods. As HDCP is typically used to protect rasterized video, vertical and horizontal blank intervals accommodate this periodic re-keying, allowing cipher engines 112 and 122 to generate intermittent encryption/decryption cipher streams without affecting the encryption or decryption of the data stream.

Figure 2:
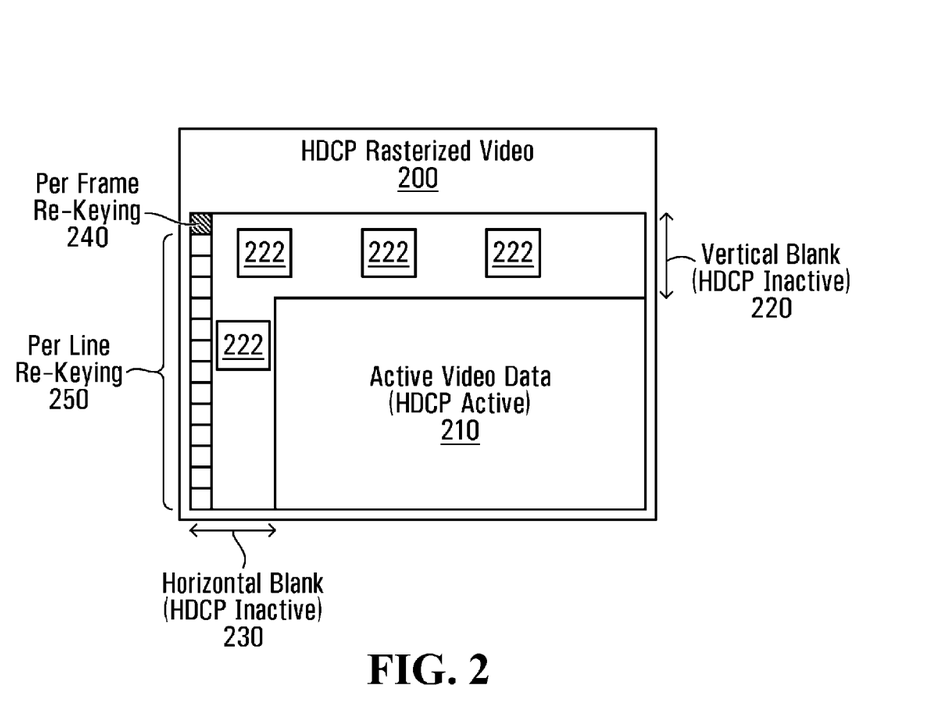
FIG. 2 is a block diagram of HDCP rasterized video.

FIG. 2 shows an example of HDCP rasterized video 200. The rasterized video includes active video data 210, during which time HDCP is active. The rasterized video also includes a vertical 220 and a horizontal blank 230, corresponding to traditional vertical and horizontal blanking intervals. Ancillary data 222 may optionally be embedded in the blanking intervals. Encryption and decryption streams stop for those portions of the vertical and horizontal blanks 220 and 230 not containing ancillary data 240. Per frame re-keying 240 and per-line re-keying can take place during the vertical and/or the horizontal blanks 220 and 230.

HDCP is more particularly detailed in the HDCP Specification Rev. 1.2 and 1.3, made available by Digital Content Protection, LLC, the contents of which are hereby incorporated by reference.

Unfortunately, not all data streams include sufficient intervals (e.g. breaks) to accommodate HDCP re-keying. Such streams do not lend themselves to encryption using the traditional HDCP protocol. For example, HDCP does not lend itself to use in association with non-rasterized video, or other data streams.

The upcoming DisplayPort protocol, for example, defines a new video interconnect that does not include sufficient breaks to accommodate HDCP re-keying. More specifically, DisplayPort is intended initially for single-stream rasterized video, but may be extended to non-rasterized, multi-stream applications where there will be no predictable breaks in the datastreams. DisplayPort is more particularly described in The DisplayPort Standard, v. 1.0 and 1.1, as published by the Video Electronics Standards Association (VESA), the contents of which are hereby incorporated by reference.

New encryption protocols that do not require re-keying are options for such streams. However, HDCP has already been accepted by industry, and HDCP engines already form part of many receivers and transmitter.

Accordingly, there is a need for a new encryption technique that allows encryption of a wide variety of data streams using cipher engines, such as those used in HDCP systems that provide intermittent encryption streams.

SUMMARY OF THE INVENTION

Exemplary of embodiments of the present invention, a primary cipher engine generates an intermittent encryption stream. The primary cipher engine may be used with a second source of cipher data that may be used while the primary engine is not providing cipher data. In one embodiment, the primary cipher engine is an HDCP cipher engine, and the second cipher engine generates a stream of unused pseudo-random data that can then be output while the HDCP cipher engine is re-keying.

In some embodiments, this is accomplished by operating the HDCP cipher engine at a higher rate than the data stream for some period of time. If this is done in a synchronized manner in both the data source and sink, the resulting operation will appear as if there is no re-keying interval as encryption and/or decryption can occur at all times, and not just outside of the re-keying interval. This eliminates constraints imposed by the re-keying interval, making HDCP applicable in many more situations, most notably in the DisplayPort standard.

In accordance with an aspect of the present invention there is provided a method for providing cipher data during a period of time when output of a primary source of cipher data is unavailable, the method comprising: switching from the primary source of cipher data to an alternate source of cipher data at a beginning of the period of time; using the cipher data from the alternate source during the period of time.

In accordance with another aspect of the invention there is provided a ciphering module comprising: a primary source for cipher data for encrypting or decrypting a data stream; an alternate source of cipher data; a switch for switching to the alternate source for cipher data during a period of time when an output of the primary source is unavailable.

In accordance with yet another aspect of the invention there is provided a ciphering system comprising: a transmitting module comprising a primary source for encryption cipher data, an alternate source for encryption cipher data and a switch for switching to the alternate source for encryption data during a period of time when output of the primary source for encryption data is unavailable and back to the primary source for encryption data after the period of time, the encryption data being for encrypting a data stream to produce an encrypted data stream; and a receiving module comprising a primary source for decryption cipher data, an alternate source for decryption cipher data and a switch for switching to the alternate source for decryption data during the period of time, the decryption data being for decrypting the encrypted data stream to produce a decrypted data stream.

Other aspects and features of the present invention will become apparent, to those ordinarily skilled in the art, upon review of the following description of the specific embodiments of the invention.

BRIEF DESCRIPTION OF THE DRAWINGS

In the figures which illustrate by way of example only, embodiments of the present invention.

DETAILED DESCRIPTION

Embodiments of the present invention use an alternate source of cipher data that can be accessed when the primary source is unavailable, such as during re-keying in HDCP.

Figure 3:
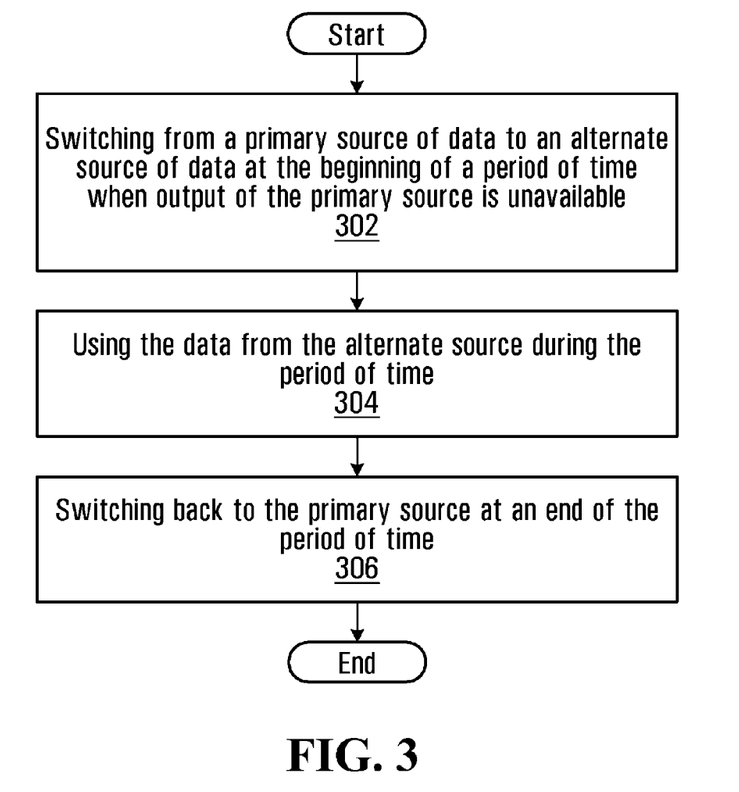
FIG. 3 is a flow chart of a method exemplary of one embodiment of the present invention.

One embodiment of the present invention is a method for providing cipher data during a period of time when output of a primary source of encryption data is unavailable, which will now be described with reference to FIG. 3.

As illustrated, the method includes switching from a primary source of cipher data to an alternate source of cipher data at a beginning of the period of time (Step 302). The cipher data may be pseudo-random data. For example, the cipher data may be cipher data output by a conventional HDCP encryption engine.

Next, the cipher data from the alternate source may be used during the period of time (Step 304). At an end of the period of time the cipher data from the primary source may again be used. (Step 306).

The period of time may a period during which the cipher data from the primary source is not available, such as during HDCP or similar re-keying. The re-keying period, may for example be before every frame of data and/or before every line of data. However, as will be appreciated the invention is not limited to re-keying periods. It can be any period of time when the primary source is unavailable. For example, during a failure at the primary source, or when the primary source is being used otherwise, so that it is not available for a data stream of interest.

The alternate source of cipher data may be a buffer. In such cases, the method may further include redirecting a portion of the cipher data from the primary source to the buffer, for later use.

For example, if the primary cipher source generates cipher data at a higher rate than the data to be encrypted, cipher data may be buffered for use in those intervals when the encryption engine ceases to provide data.

In a very specific example, an HDCP cipher engine may be used to encrypt DisplayPort data. HDCP cipher data is typically generated at 3 bytes per cycle, whereas each lane of DisplayPort data only requires 1 byte per cycle. If there is one HDCP cipher engine for one or two lanes, one byte per cycle can be directed to the buffer until the buffer is full. Thus, in an embodiment of the invention, the method further comprises directing excess cipher data to the buffer for a predetermined period of time after a re-keying period. As the typical worst case scenario in HDCP is a frame re-key that requires 142 cycles, the buffer in a preferred embodiment holds 142 bytes for each lane of data to be encrypted or decrypted. In some cases, the excess cipher data is produced by generating the cipher data at a higher rate than a data stream to be encrypted or decrypted.

The buffer may be a FIFO (First In First Out) buffer.

This allows encryption and/or decryption by an HDCP cipher engine to continue when the primary HDCP cipher engines are unavailable, such as during re-keying periods. This, in turn, allows non-rasterized video data that lacks predictable breaks in the data stream to be encrypted. Conveniently, non-rasterized video data may be encrypted using the resulting encryption stream. In specific embodiments, the method further comprises encrypting or decrypting DisplayPort data.

In an alternate embodiment, the second source of encryption data may be a second HDCP cipher engine.

Figure 4:
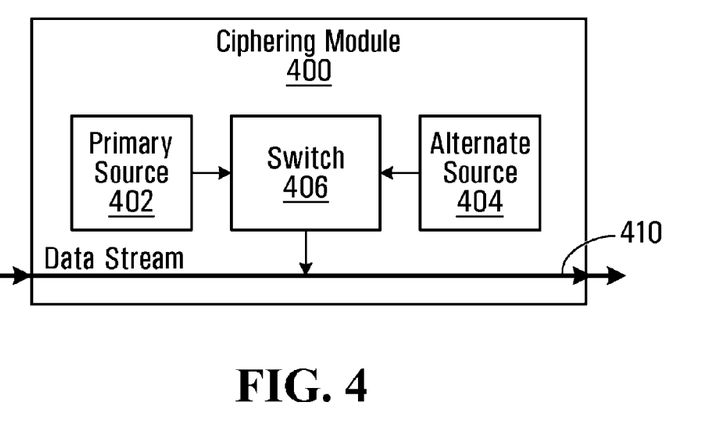
FIG. 4 is a block diagram of a ciphering module exemplary of an embodiment of the present invention.

FIG. 4 illustrates a ciphering module 400, exemplary of an embodiment of the present invention. Ciphering module 400 includes a primary source for cipher data 402, an alternate source for cipher data 404 and a switch 406. The cipher data generated by the primary and the alternate sources 402, 402 is for encrypting or decrypting a data stream 410. Switch 406 may switch to the alternate source for cipher data 404 during a period of time when an output of the primary source 402 is unavailable. Switch 406 could, for example, switch precisely when cipher data 402 is not available. Alternatively, switch 406 could switch between cipher data 402 and cipher 404 at regular (or irregular) intervals, such that cipher data is always available. Alternatively Switch 406 may be a controllable switch, or a multiplexer. Switch 406 could alternatively be implemented as a register or other pointer to memory or a buffer in which cipher data from either or both source 402 and 404 is stored. The pointer/register could be updated to select between cipher data from either source. Alternatively, switch 406 could be any other device or functional block for selecting between sources 402 and 404, understood by a person skilled in the art.

In some embodiments, alternate source 404 is a buffer, as described above. In some cases the module 400 includes a functional block to direct a portion of the cipher data from the primary source to the buffer. The functional block could take the form of a multiplexer, switch, or the like. In some cases, the portion of the cipher data directed to the buffer is excess cipher data not required for encryption or decryption. For example, control signals are not encrypted and therefore, portions of the data stream 410 that include control signals do not require cipher data. Typically, the cipher data generated at the time a control signal appears in the data stream 410 is simply not used and therefore it is available to be redirected to the buffer.

Primary source 402 may alternatively generate the cipher data at an accelerated rate while the portion of the cipher data is being directed to the buffer. In some cases, the primary source 402 operates at this accelerated rate at all times. Operating at the same rate at all times is simpler and requires less control than changing the rate depending on whether or not the buffer is full. In some embodiments, the portion of the cipher data directed to the buffer is cipher data generated when the data stream 410 to be encrypted or decrypted comprises control data.

Again, the cipher data may be HDCP cipher data.

Figure 5:
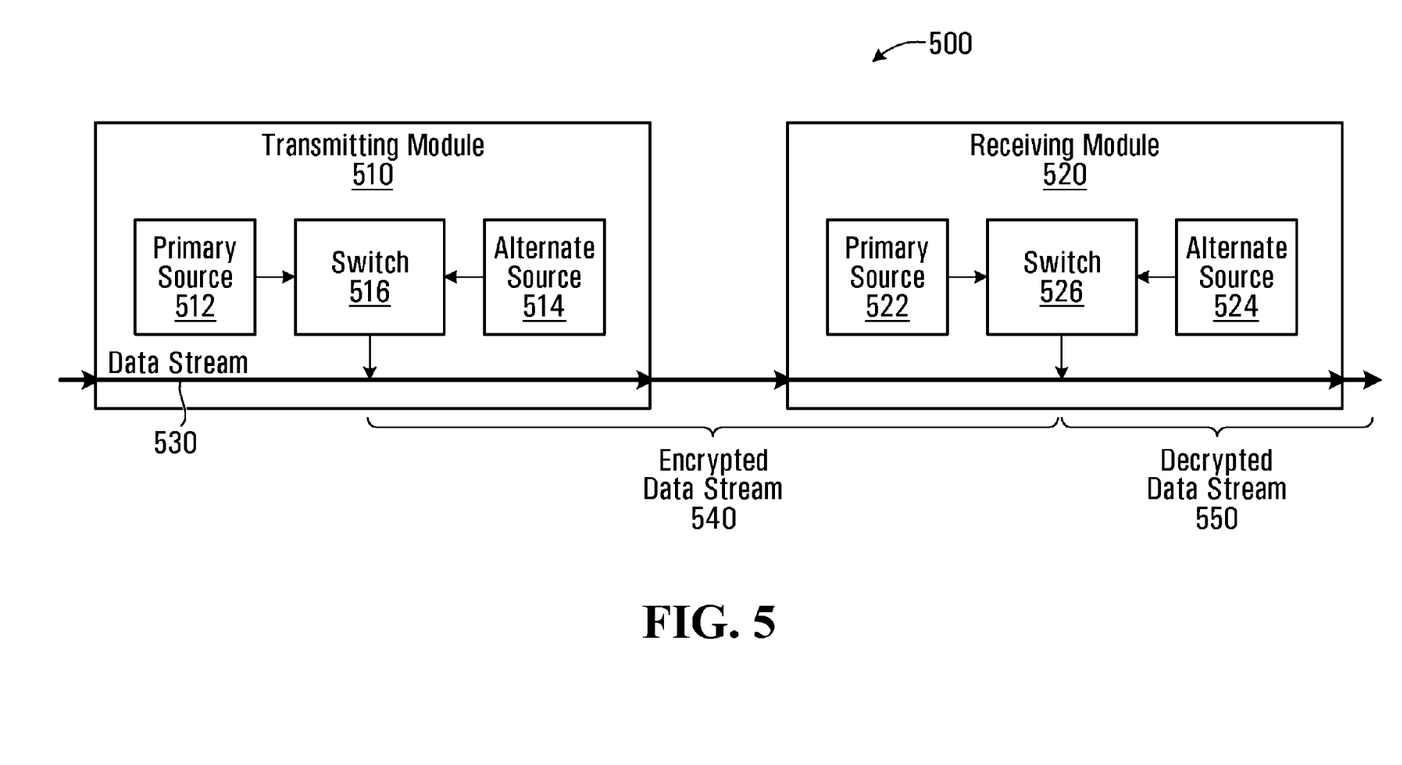
FIG. 5 is a block diagram of a ciphering system exemplary of an embodiment of the present invention.

Referring to FIG. 5, a ciphering system 500 exemplary of another embodiment of the invention comprises a transmitting module 510 and a receiving module 520. The transmitting module 510 comprises a primary source 512 for encryption cipher data, an alternate source 514 for encryption cipher data and a switch 516 for switching to the alternate source 514 for encryption data during a period of time when output of the primary source 512 for encryption data is unavailable and back to the primary source 512 for HDCP encryption data after the period of time. The encryption cipher data is used for encrypting a data stream 530 to produce an encrypted data stream 540. Receiving module 520 includes a primary source 522 for decryption cipher data, an alternate source 524 for decryption cipher data and a switch 526 for switching to the alternate source 524 for decryption data during the period of time and back to the primary source 522 for decryption data after the period of time. The decryption cipher data is for decrypting the encrypted data stream 540 to produce a decrypted data stream 550.

In some embodiments, switch 516, 526 of each of the transmitting module 510 and the receiving module 520 are adapted to switch to the respective alternate source 514, 524 at a beginning of a re-keying period and back to the respective primary source 512, 522 at an end of a re-keying period.

In some embodiments, transmitting module 510 further includes an XOR gate for combining the encryption data with the data stream 530. Likewise, some embodiments of the receiving module 520 further include an XOR gate for combining the decryption data with the encrypted data stream 540.

Again, the cipher data may be HDCP cipher data.

System 500 may be adapted for use with DisplayPort protocol. In such cases, the transmitting module 510 can be located at an interface between a Link layer and PHY prior to lane skewing and the receiving module 520 can be located at an interface between a Link layer and PHY prior to lane de-skewing.

As can be appreciated, some embodiments of the invention require excess pseudo-random data that can be buffered and output in lieu of a cipher engine's output during the re-keying periods where the cipher engine's output is unavailable. The amount of buffering required, the rate(s) at which the cipher engine needs to be clocked, the period of time for which the cipher engine is clocked at the aforementioned rate(s), and the synchronization mechanism between the source or transmitter engine and the sink or receiver engine depend on the particular application and are at the discretion of the designer.

Specific solutions for mapping HDCP cipher data onto DisplayPort will now be described with reference to FIGS. 6 to 14.

DisplayPort is a high bandwidth point-to-point digital interconnect solution that will ultimately be capable of supporting a multitude of data formats and types over a scalable link that currently supports 1, 2, or 4 data lanes, each of which can transfer either 162 MB or 270 MB of data per second.

HDCP's output cipher can generate up to 3 B/cycle of pseudo-random data, whereas DisplayPort requires either 1 B, 2 B, or 4 B/cycle of cipher data depending on the number of active lanes. In the 1 and 2 lane cases, a single instance of the HDCP cipher can be used, and in the 4 lane case two instances of the HDCP cipher can be used. Note that a single engine can be used in all cases if one were willing to overclock the 4 lane configuration to ensure sufficient HDCP pseudo-random data was available for both buffering up the excess and meeting the needs of the output stream when re-keying was not active.

If one or more cipher engines are clocked at the same rate as the transmitter logic then it will generate (3/1)/(3/2)/(2·3/4)=3×/1.5×/1.5× more data than is required for the 1/2/4 lane configurations, respectively. Some or all of the excess data that is generated can be stored in a buffer for an unspecified period of time, and then output during the period of time that the cipher is unavailable while it is being re-keyed. The resulting implementation is shown in FIG. 6.

Figure 6:
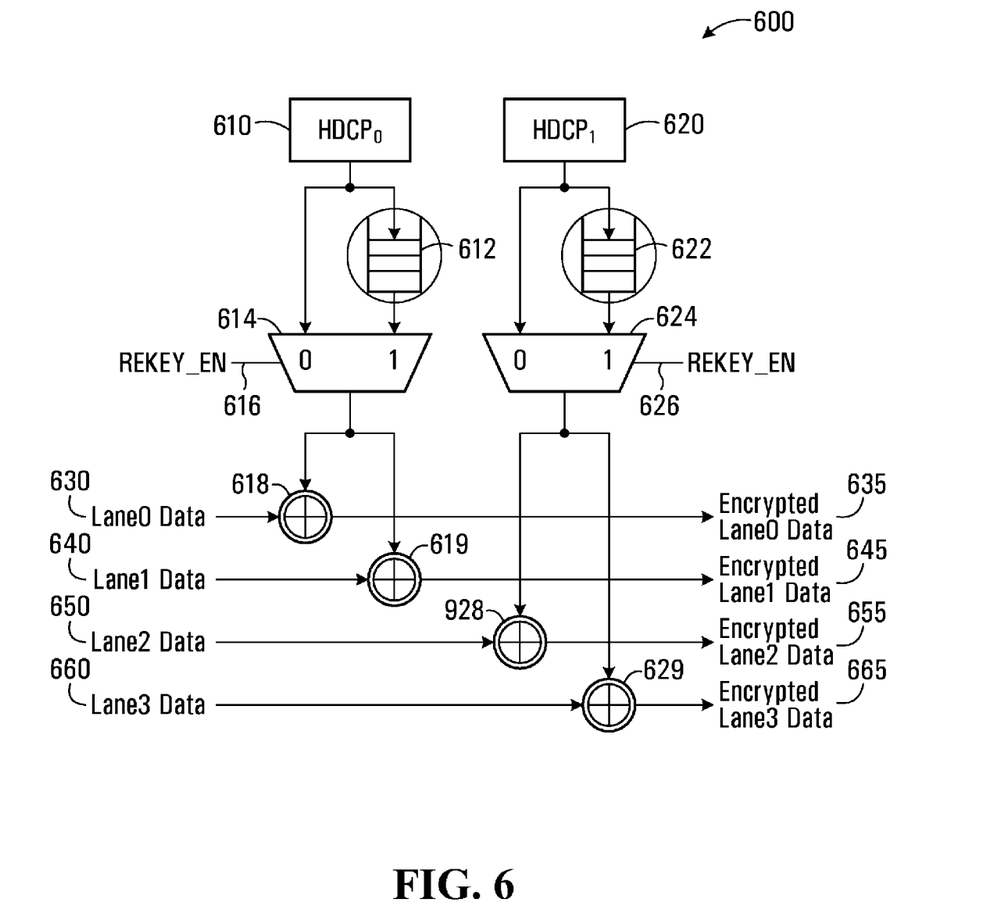
FIG. 6 is a block diagram of an HDCP module exemplary of an embodiment of the present invention.

In FIG. 6, an HDCP module 600 comprises two HDCP cipher engines 610 and 620 to service four lanes of data 630, 640, 650, and 660. The first cipher engine 610 provides 2 B/cycle of cipher data directly to a multiplexer 614 and 1 B/cycle to a FIFO buffer 612. The output of FIFO 612 is also provided to a multiplexer 614. Multiplexer 614 also has as an input a signal REKEY_EN 616 which indicates whether or not the cipher engine 610 is in re-key mode. In this case, the value 0 represents active mode and the value 1 represents re-key mode. Therefore, when multiplexer 614 receives a 0, the cipher data is directed from the cipher engine 610 to XOR gates 618 and 619 to combine with data from lanes 630 and 640, respectively, to produce respective encrypted data lanes 635 and 645. The same set-up is mirrored for the second cipher engine 620. That is, 2 B/cycle of cipher data are provided directly to a multiplexer 624 and 1 B/cycle is provided to a FIFO buffer 622. The output from the FIFO 622 also goes to the multiplexer 624. The multiplexer 624 also has as an input a signal REKEY_EN 626 which indicates whether or not the cipher engine 620 is in re-key mode. When the multiplexer 624 receives a 0, the cipher data is directed from the cipher engine 620 to XOR gates 628 and 629 to combine with data from lanes 650 and 660, respectively, to produce respective encrypted data lanes 655 and 665.

The rate at which the ciphers are clocked, and the period of time they are run at the accelerated rate is entirely at the discretion of the designer so long as there is sufficient excess data stored in FIFOs 612, 622 to encrypt the data stream during the re-keying period. For HDCP, 142 cycles worth of data on a per-frame basis, or 58 cycles worth of data on a per-line basis, should be available, where the concepts of "frame" and "line" can be defined to suit the application. Literal definitions of "line" and "frame" apply in the case of rasterized video data, but for less structured data patterns a "line" could be defined as the time between blanking start (as indicated by blanking start ("BS")) control symbols, and a "frame" could be defined as the time between successive scrambler reset ("SR") control symbols which occur every 512th BS control symbol.

Synchronization between the source and sink device's HDCP engines to ensure they generate the same excess data can be maintained by a simple a priori-defined strategy in which excess bytes are identified and tagged for storage. For example, ciphers may be run at same rate as data stream. The first 256 B of excess data may be stored after the end of the re-key period, and are then buffered until the next re-key period. The buffer is flushed at the end of each re-key period to ensure the source and sink start with the same FIFO state each period.

Figure 7:
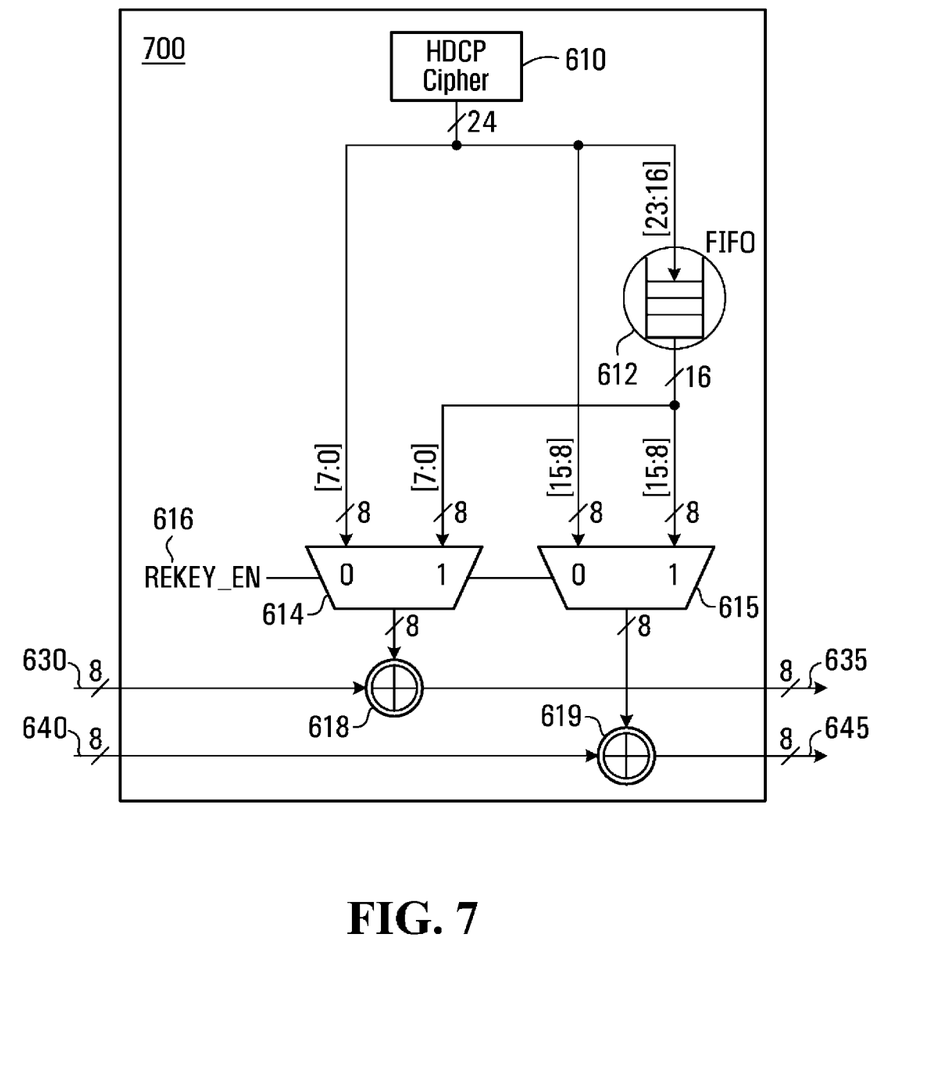
FIG. 7 is a block diagram of an HDCP module exemplary of an embodiment of the present invention.

Another configuration of the HDCP module 600 is exemplified in FIG. 7. As illustrated, HDCP module 700 represents only one half of the module 600, i.e. the half serviced by HDCP cipher engine 610. In this configuration, there is an additional multiplexer 615 with an output to XOR gate 619. The cipher engine 610 directs 1 B/cycle to multiplexer 614, 1 B/cycle to multiplexer 615 and 1 B/cycle to FIFO 612.

Figure 8:
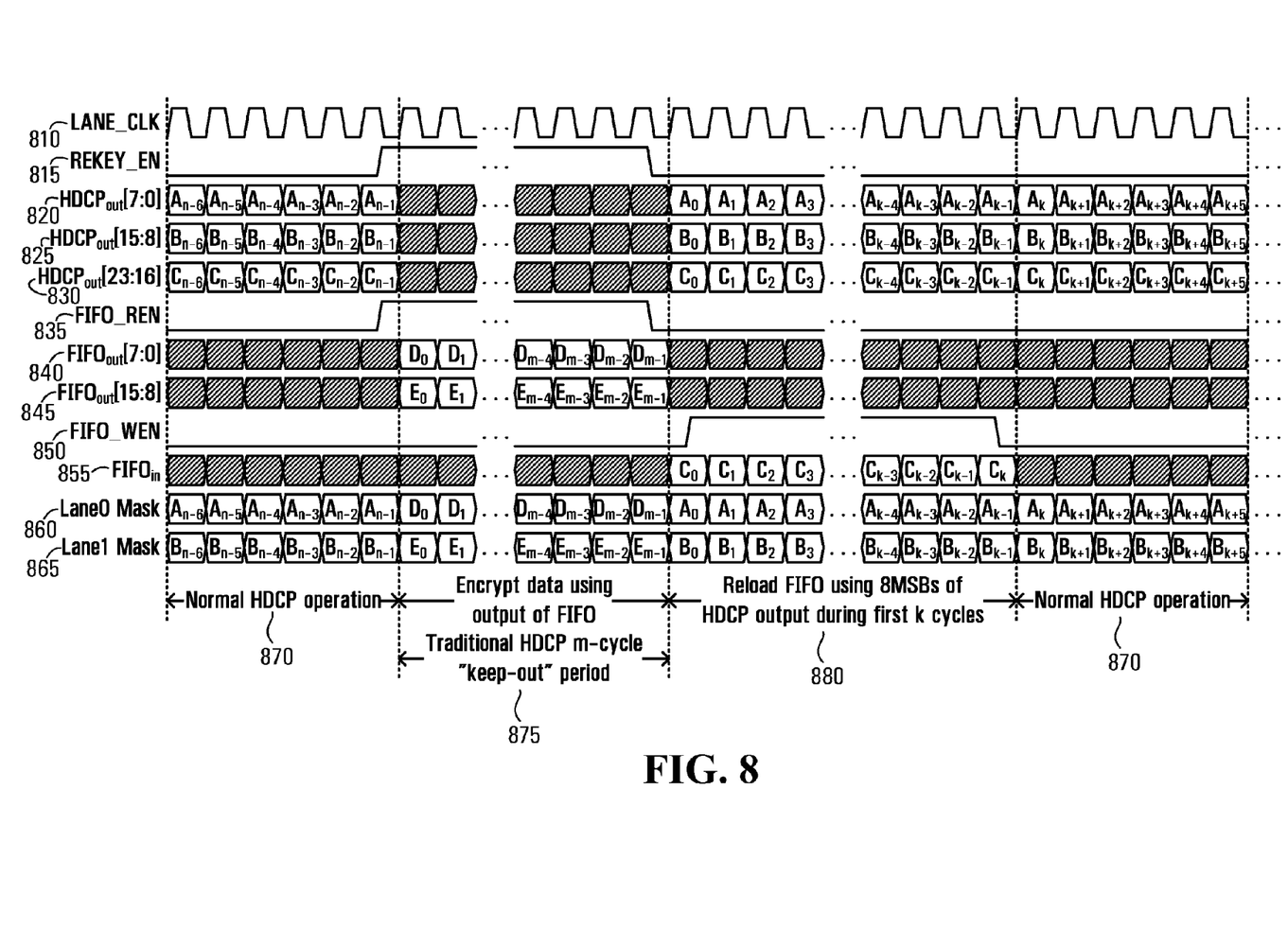
FIG. 8 is a timing diagram for an HDCP module exemplary of an embodiment of the present invention.
Figure 9:
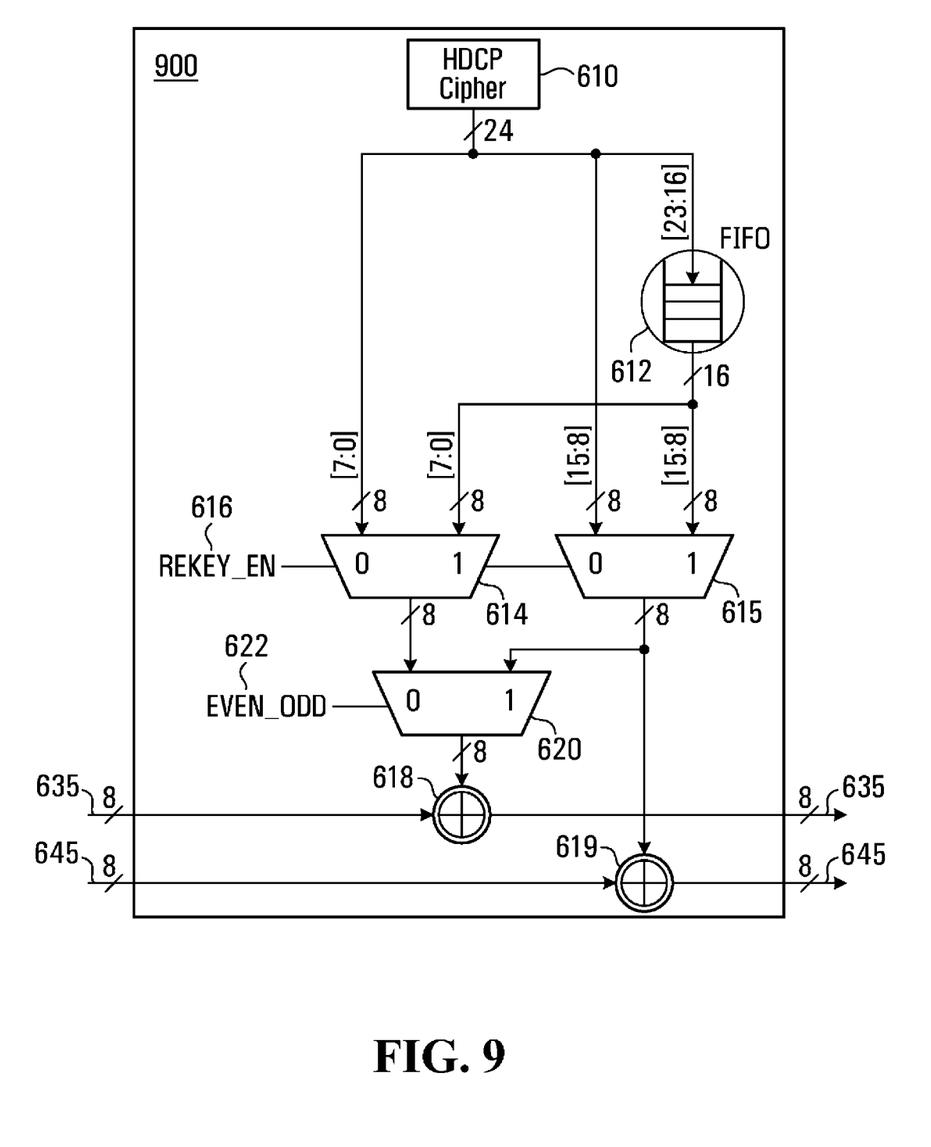
FIG. 9 is a block diagram of an HDCP module exemplary of an embodiment of the present invention.

As mentioned above, embodiments of the present invention can be applied to 1, 2 or 4 lane configurations of DisplayPort. A timing diagram for the 2 lane configuration is shown at FIG. 8. The timing diagram of FIG. 8 shows the timing for 12 signals: LANE_CLK 810, which is the clock; REKEY_EN 815, which indicates if the HDCP engine is in re-key mode or not; $HDCP_{out}[7:0]$ 820, $HDCP_{out}[15:8]$ 825, and $HDCP_{out}[23:16]$ 830, which are outputs from the HDCP cipher engine; FIFO_REN 835, which signals the FIFO to output the cipher data; $FIFO_{out}[7:0]$ 840 and $FIFO_{out}[15:8]$ 845, outputs from the FIFO; FIFO_WEN 850, which indicates that the FIFO is being replenished; $FIFO_{in}$ 855, which is the input for the FIFO; Lane0 Mask 860 and Lane1 Mask 865, which represents the cipher data to be used to encrypt or decrypt the two lanes. The first time block is Normal HDCP operation 870, during which time the HDCP outputs 820 and 825 provide the data for the Lane0 Mask 860 and the Lane1 Mask 865. The FIFO outputs 840 and 845 are inactive. For the purposes of this example, the FIFO is already full at the start of the timing diagram. The next block of time is the HDCP keep-out or re-key period 875, during which time the FIFO outputs 840 and 845 provide the data for the Lane0 Mask 860 and the Lane1 Mask 865. The HDCP outputs 820, 825, and 830 are inactive during this time. REKEY_EN 815 has a value of 1 during this period and 0 at all other times. The next block of time is the FIFO reload period 880, during which time the $FIFO_{in}$ 855 receives data from $HDCP_{out}[23:16]$ 830 in order to reload the FIFO. FIFO_WEN 850 has a value of 1 during this period and a value of 0 during all other periods. All other signals operate as if during HDCP normal operation 870.

For the four lane configuration, the timing diagram is repeated for the second HDCP engine. For the single lane configuration, there is no Lane1 Mask 865, which means that $FIFO_{out}[15:8]$ 845 is not used. Otherwise, the timing is the same.

Figure 10:
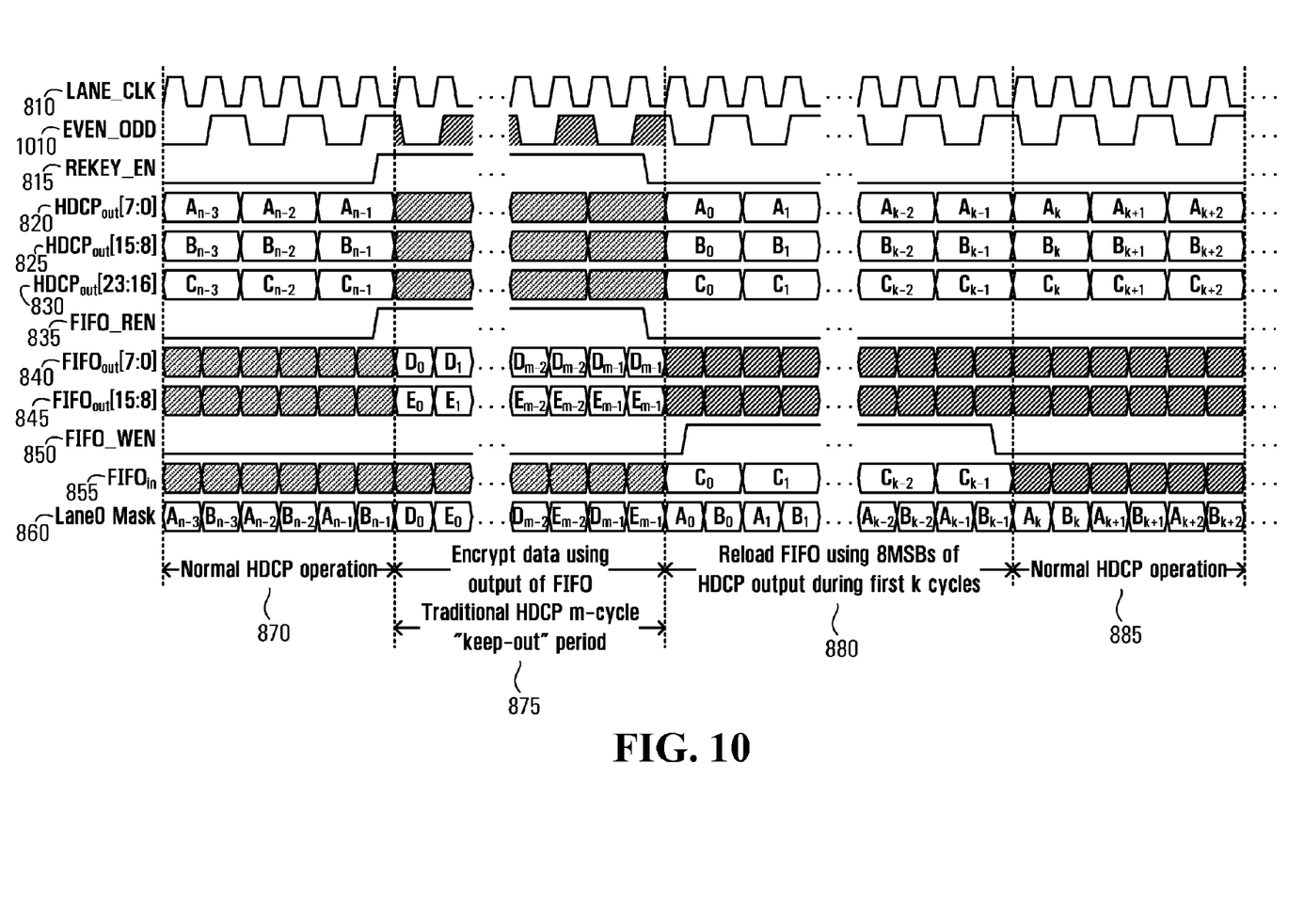
FIG. 10 is a timing diagram for an HDCP module exemplary of an embodiment of the present invention.

In a one lane configuration, only 1 B/cycle of HDCP cipher data is required for encryption or decryption and therefore, the cipher engine can be run at half rate. An embodiment of the present invention that enables a one lane configuration at half rate, in addition to a two lane configuration, will now be described with reference to FIG. 9. HDCP module 900 is the same as HDCP module 700, described with reference to FIG. 7, with the exception of an additional multiplexer 620 between the multiplexers 614 and 615 and XOR gate 618. The inputs to the multiplexer 620 are outputs from multiplexers 614 and 615, as well as an EVEN_ODD signal 622. The output from multiplexer 615 also goes to XOR gate 619. In single lane mode, the lane on which XOR gate 619 is located is inactive, the HDCP cipher engine 610 runs at ½ rate and the EVEN_ODD signal 622 oscillates between 0 and 1. The oscillating signal 622 results in the output of multiplexer 620 being a combination of the outputs of multiplexers 614 and 615. In two lane mode, the HDCP cipher engine 610 runs at full rate and the EVEN_ODD signal has a value of 0. FIG. 10 is a timing diagram for the signal lane mode of this embodiment and FIG. 11 is a timing diagram for the two lane mode.

The timing diagram of FIG. 10 includes all of the same signals as FIG. 8 except for Lane1 Mask 865. It has one additional signal, EVEN_ODD 1010, which oscillates during all of the time blocks.

Figure 11:
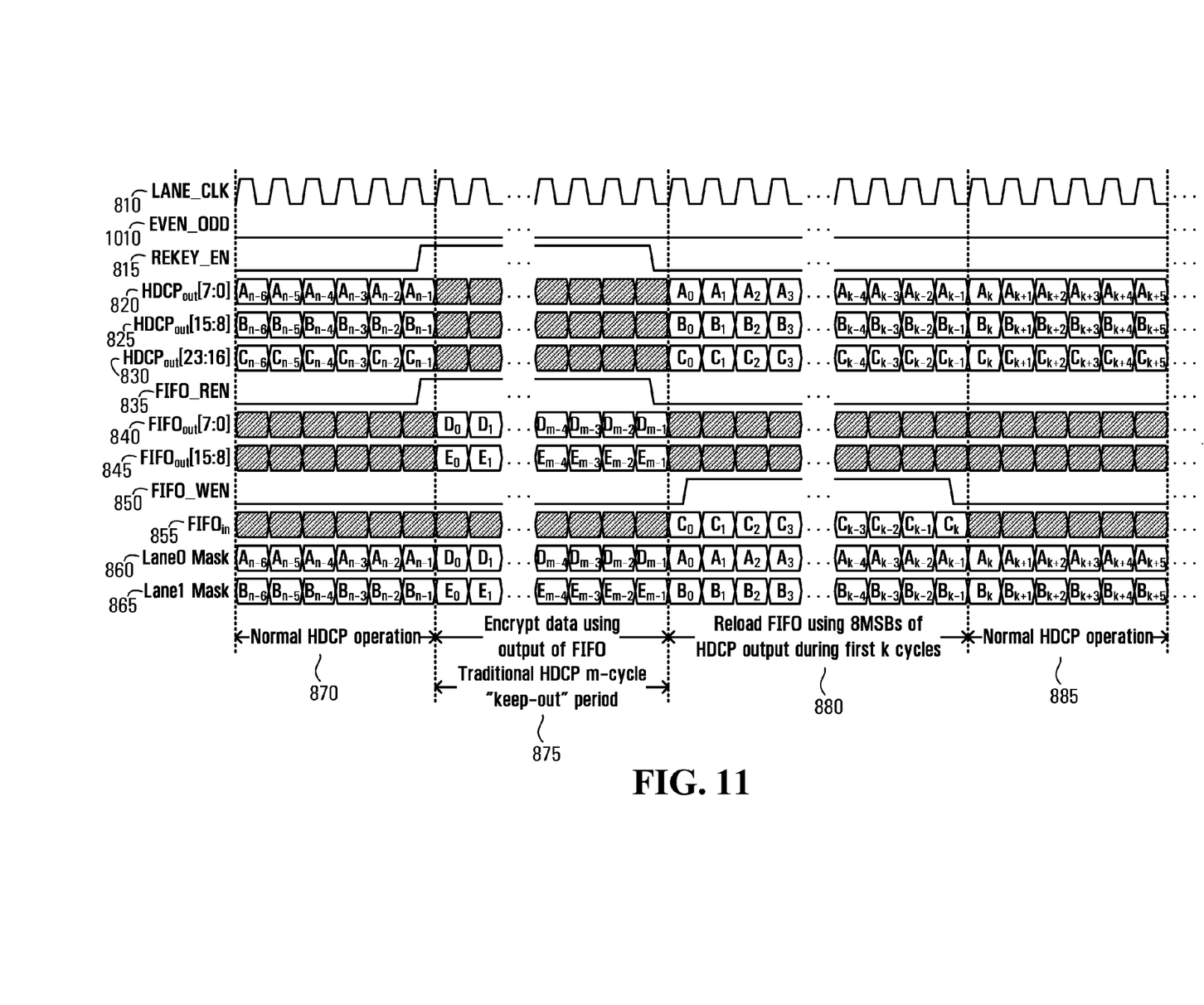
FIG. 11 is a timing diagram for an HDCP module exemplary of an embodiment of the present invention.

FIG. 11 is the same as FIG. 8 except that it includes the EVEN_ODD signal described with reference to FIG. 10. In FIG. 11, the EVEN_ODD signal maintains a value of 0 and therefore the HDCP module operates in the same manner as the two lane mode described with reference to FIG. 8.

Alternatively, in single lane mode, the HDCP engine could be run a ⅓ rate. In this embodiment, the cipher data directed the buffer would have to be cipher data not used when the data stream comprises control signals.

Figure 12:
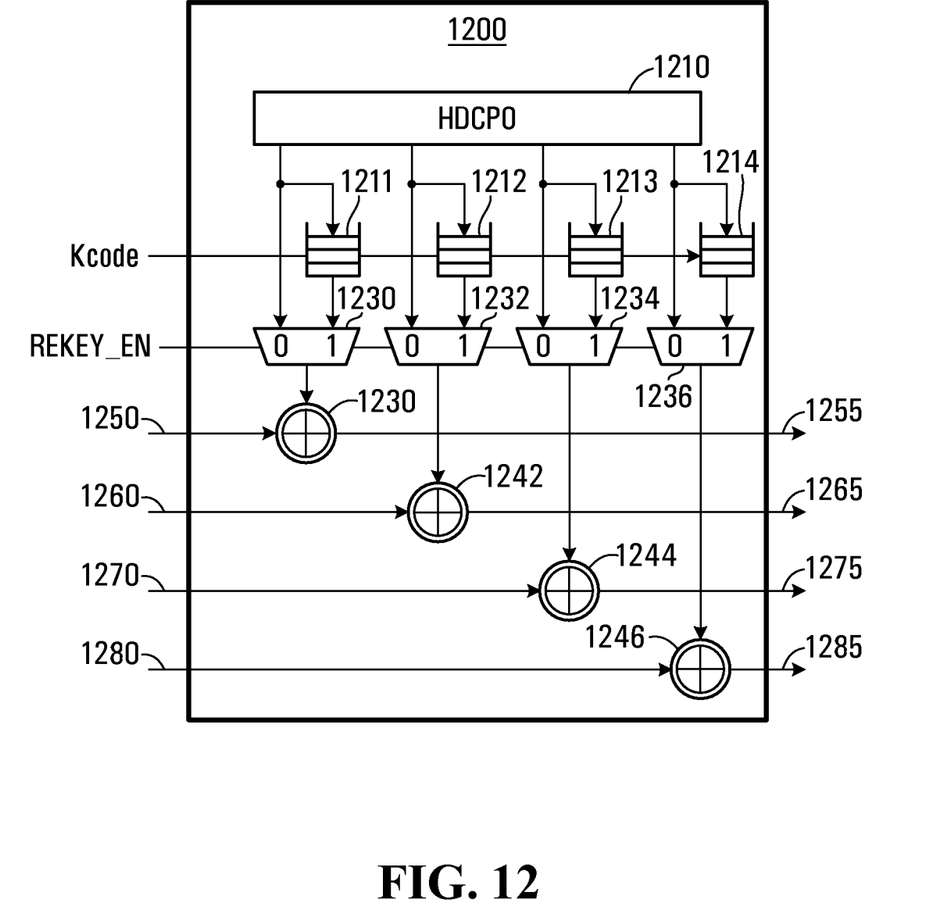
FIG. 12 is a block diagram of an HDCP module exemplary of an embodiment of the present invention.

In another alternative embodiment, the HDCP cipher may be modified to output at 4 B/cycle. This enables one HDCP cipher engine to service 4 lanes of DisplayPort data. The buffer is filled with HDCP output not used when the data stream includes control data. FIG. 12 is a schematic of an HDCP module 1200 according to one embodiment of this solution.

An HDCP cipher 1210 in the HDCP module 1200 outputs 4 B/cycle, with one byte going to each of four multiplexers 1230, 1232, 1234, and 1236. Each multiplexer also has as an input the output of a respective FIFO 1211, 1212, 1214, and 1216. All four FIFOs have as an input a Kcode signal 1220, which indicates that the data streams 1250, 1260, 1270 and 1280 contain control signals. The outputs from the HDCP cipher 1210 are directed to the FIFOs 1211, 1212, 1214, and 1216 when the data streams 1250, 1260, 1270 and 1280 contain control signals. Multiplexers 1230, 1232, 1234, and 1236 all receive a REKEY_EN signal 1225 as an input. When this signal 1225 indicates that the HDCP cipher is in re-key mode, they use the cipher data from their respective FIFO as their output. As with previous examples, the outputs from the multiplexers are directed to XOR gates 1240, 1242, 1244 and 1246 where the cipher data is combined with data streams 1250, 1260, 1270 and 1280 to produce output data streams 1245, 1255, 1265 and 1275 respectively.

Alternatively, and more generally HDCP cipher 1210 could be clocked at a higher rate than required for the N lanes. For example, HDCP cipher 1210 could be clocked at a rate to provide cipher data at a rate N/(N−M) the data rate of each lane. M of every N units of cipher data may then be provided to a FIFO, for later use.

An alternative solution that may be attempted is to utilize more than one HDCP engine running at more than the required data rate and using the output of one HDCP engine to hide the re-keying interval of the other engine(s). When one engine is re-keying, i.e. its output is disabled, the other cipher engine(s) would be used to encrypt the data stream. This additional encryption could be accomplished by either enabling the additional cipher if it were sitting idle waiting to be used, or overclocking it to generate the additional pseudo-random data required by the stream whose cipher is currently re-keying.

For this solution one cipher engine must always be available for use during a re-keying interval and the re-keying of the engines should be staggered sufficiently that there is never a period of time in which all cipher engines are requiring re-keying at the same time. There must also be sufficient bandwidth within the pool of HDCP engines either by the sheer number of cipher instances or ability to overclock any number of the available instances to provide the required amount pseudo-random data at any given time.

As will now be appreciated, methods described herein may be implemented in hardware, software or combinations thereof. For example, a computer readable medium having computer readable instructions stored thereon that when implemented by a computer execute the respective method. They may be implemented using hardware, software or combinations thereof.

What has been described is merely illustrative of the application of the principles of the invention. Rather, other arrangements and methods can be implemented by those skilled in the art without departing from the scope of the present invention.

The invention claimed is:

1. A method for providing streams of cipher data for combining with a data stream to continuously encrypt or decrypt said data stream, the method comprising:
   at an electronic device comprising a primary source of cipher data for providing a primary stream of cipher data on a first cipher data stream path, an alternate source of cipher data for providing an alternate stream of cipher data on a second cipher data stream path, and a switch:
   providing said primary stream of cipher data from the primary source of cipher data on said first cipher data stream path for combining with said data stream to encrypt or decrypt said data stream;
   using the switch to switch from the primary source of cipher data to the alternate source of cipher data at a beginning of a period of time when output of the primary source of cipher data is unavailable; and
   providing said alternate stream of cipher data from the alternate source of cipher data on said second cipher data stream path for combining with said data stream to encrypt or decrypt said data stream during the period of time;
   whereby each element of said data stream is continuously combined with an element of cipher data to continuously encrypt or decrypt said data stream.

2. A method according to claim 1, further comprising using the switch to switch back to the primary source of cipher data at an end of the period of time.

3. A method according to claim 2, wherein the period of time is a re-keying period.

4. A method according to claim 3, wherein the re-keying period is after every frame of data and/or after every line of data.

5. The method of claim 1, wherein the primary source of cipher data is an HDCP (High-bandwidth Digital Content Protection) cipher engine.

6. A method according to claim 5, wherein the alternate source of cipher data is provided by a second HDCP cipher engine.

7. A method according to claim 1, wherein the alternate source of cipher data is a buffer.

8. A method according to claim 7, further comprising directing a portion of the cipher data from the primary source of cipher data to the buffer.

9. A method according to claim 7, further comprising directing excess cipher data from the primary source of cipher data to the buffer for a predetermined period of time after a re-keying period.

10. The method of claim 9, wherein the excess cipher data is produced by generating the cipher data at a higher rate than a data stream to be encrypted or decrypted.

11. A method according to claim 7, wherein the buffer is a FIFO (First In First Out) memory.

12. A method according to claim 1, further comprising encrypting or decrypting non-rasterized video data.

13. A method according to claim 1, further comprising encrypting or decrypting DisplayPort data.

14. A method according to claim 1, wherein the cipher data is pseudo-random data.

15. A non-transitory computer readable storage medium having computer readable instructions stored thereon that when implemented by a computer execute the method of claim 1.

16. The method of claim 1, wherein said primary source of cipher data comprises a cipher generator for generating said primary stream of cipher data, and said period of time when output of the primary source of cipher data is unavailable comprises a period of time when said cipher generator stops generating cipher data.

17. An electronic device for continuously encrypting or decrypting a data stream, said electronic device comprising:
   a primary source of cipher data for providing a primary stream of cipher data on a first cipher data stream path for combining with said data stream to encrypt or decrypt the data stream;
   an alternate source of cipher data for providing an alternate stream of cipher data on a second cipher data stream path for combining with said data stream to encrypt or decrypt the data stream; and
   a switch for switching to the alternate source for cipher data during a period of time when an output of the primary source is unavailable;
   wherein said providing the primary stream of cipher data on said first cipher data stream path, said switching to the alternate source for cipher data, and said providing the alternate stream of cipher data on said second cipher data stream path, allows each element of the data stream to be continuously combined with an element of cipher data to continuously encrypt or decrypt said data stream.

18. The device of claim 17, wherein the cipher data is HDCP (High-bandwidth Digital Content Protection) cipher data.

19. The device of claim 17, wherein the alternate source is a buffer.

20. The device of claim 19, further comprising means for directing a portion of the cipher data from the primary source to the buffer.

21. The device of claim 20, wherein the primary source is adapted to generate the cipher data at an accelerated rate while the portion of the cipher data is being directed to the buffer.

22. The device of claim 20, wherein the portion of the cipher data directed to the buffer is excess cipher data not required for encryption or decryption.

23. The device of claim 22, wherein at least a portion of the cipher data directed to the buffer is cipher data generated when the data stream to be encrypted or decrypted comprises control data.

24. The device of claim 17, wherein said primary source of cipher data comprises a cipher generator for generating said primary stream of cipher data, and said period of time when output of the primary source of cipher data is unavailable comprises a period of time when said cipher generator stops generating cipher data.

25. A ciphering system comprising:
a transmitting device comprising a primary source of encryption cipher data for providing a primary stream of encryption cipher data on a first encryption cipher data stream path for combining with a data stream to encrypt said data stream, an alternate source of encryption cipher data for providing an alternate stream of encryption cipher data on a second encryption cipher data stream path for combining with said data stream to encrypt said data stream, and a first switch for switching to the alternate source of encryption cipher data during a period of time when output of the primary source of encryption cipher data is unavailable and back to the primary source of encryption cipher data after the period of time, each element of said data stream being continuously combined with an element of encryption cipher data to continuously produce an encrypted data stream; and
a receiving device comprising a primary source of decryption cipher data for providing a primary stream of decryption cipher data on a first decryption cipher data stream path for combining with said encrypted data stream to decrypt said encrypted data stream, an alternate source of decryption cipher data for providing an alternate stream of decryption cipher data on a second decryption cipher data stream path for combining with said encrypted data stream to decrypt said encrypted data stream, and a second switch for switching from the primary source of decryption cipher data to the alternate source of decryption cipher data during the period of time, each element of said encrypted data stream being continuously combined with an element of decryption cipher data to continuously produce a decrypted data stream.

26. The system of claim 25, wherein said first and second switches are adapted to switch to the respective alternate source at a beginning of a re-keying period and back to the respective primary source at an end of a re-keying period.

27. The system of claim 25, wherein the transmitting device further comprises an XOR (Exclusive Or) gate for said combining.

28. The system of claim 25, wherein the receiving device further comprises an XOR (Exclusive Or) gate for said combining.

29. The system of claim 25, wherein the encryption cipher data and the decryption cipher data are HDCP (High-bandwidth Digital Content Protection) data.

30. The system of claim 25, wherein said primary source of encryption cipher data comprises a cipher generator for generating said primary stream of encryption cipher data, and said period of time when output of the primary source of encryption cipher data is unavailable comprises a period of time when said cipher generator stops generating cipher data.

31. The system of claim 25, wherein said primary source of decryption cipher data comprises a cipher generator for generating said primary stream of decryption cipher data, and said period of time when output of the primary source of decryption cipher data is unavailable comprises a period of time when said cipher generator stops generating cipher data.

* * * * *